United States Patent [19]

Kyonomine

[11] Patent Number: 4,604,913

[45] Date of Patent: Aug. 12, 1986

[54] PARKING BRAKE RELEASING MECHANISM

[75] Inventor: Masaru Kyonomine, Toyota, Japan

[73] Assignee: Toyota Jidosha Kogyo Kabushiki Kaisha, Aichi, Japan

[21] Appl. No.: 549,012

[22] Filed: Nov. 4, 1983

Related U.S. Application Data

[63] Continuation of Ser. No. 851,702, Nov. 15, 1977, abandoned.

[30] Foreign Application Priority Data

Nov. 16, 1976 [JP] Japan .................. 51-153742[U]

[51] Int. Cl.⁴ .............................................. G05G 5/06
[52] U.S. Cl. ........................................ 74/540; 74/516; 74/529
[58] Field of Search ................. 74/529, 540, 541, 542, 74/575, 577 S, 577 R, 516, 518

[56] References Cited

U.S. PATENT DOCUMENTS

| | | | |
|---|---|---|---|
| 803,264 | 10/1905 | Balke | 74/577 S |
| 2,119,638 | 6/1938 | Klampferer | 74/540 |
| 2,995,047 | 8/1961 | Hinsey | 74/575 X |
| 3,200,907 | 8/1965 | Hansen | 74/577 X |
| 3,267,765 | 8/1966 | Stohler | 74/540 X |
| 3,490,294 | 1/1970 | Antrim | 74/516 |
| 3,587,342 | 6/1971 | Yamazaki | 74/540 |
| 3,648,541 | 3/1972 | Hybarger et al. | 74/540 |

FOREIGN PATENT DOCUMENTS 47-22499  7/1972  Japan .

Primary Examiner—Kenneth J. Dorner
Attorney, Agent, or Firm—Parkhurst & Oliff

[57] ABSTRACT

A parking brake releasing mechanism for used in a vehicle which has solved an apparently illogical problem, that is, minimizing the operating power of the brake releasing rod (or lever in some case) without increasing the stroke thereof, by ingeniously combining a first lever secured to a pawl for restraining the quadrant or toothed portion and a second lever operated by a brake releasing rod, in their constructing way such that the lever ratio is maintained large while the pawl is in engagement with the quadrant and is lowered after the engagement has been released.

18 Claims, 6 Drawing Figures

PARKING BRAKE RELEASING MECHANISM

This is a continuation of application Ser. No. 851,702 filed Nov. 15, 1977 and now abandoned.

BACKGROUND OF THE INVENTION

The present invention relates to a parking brake releasing mechanism. More particularly it relates to an improvement in a pawl release mechanism for use to a parking brake system of the type wherein one constituting or actuator member thereof is provided with a toothed portion or a quadrant which is engaged with a pawl for arresting the return of the actuator member back to the brake-released position.

In such a type of parking brake an actuator member having a quadrant is being strongly biased, by one means or another, in the returning direction back to the brake-released position. A large frictional force is therefore created between the above return-biased quadrant and the pawl for blocking the return; as a result of which a fairly large force is needed for releasing the pawl from the quadrant. It necessarily requires an enlargement of the lever ratio of the releasing mechanism for decreasing the operating power of an operator to be applied to a brake releasing rod or lever in some case (herein after simply called release rod or lever). Enlarging the lever ratio, with the object of decreasing the operating power for the release rod or lever, inevitably invites an increase of the stroke of the release rod or lever. Generally speaking, it is desirable for an operating lever to be small in operating power and short in stroke thereof. It is a particularly severe problem in respect of vehicles wherein a good operability is badly needed in a fairly narrow operation space.

SUMMARY OF THE PRESENT INVENTION

It is therefore an object of this invention to overcome two of the apparently contradicting requirements, that is decreasing both the operating power for the release rod or lever and the operation stroke thereof for providing a novel brake release device, by ingeniously utilizing the characteristic feature of the brake release mechanism itself.

DETAILED DESCRIPTION OF A PREFERRED EMBODIMENT

Figure 1:
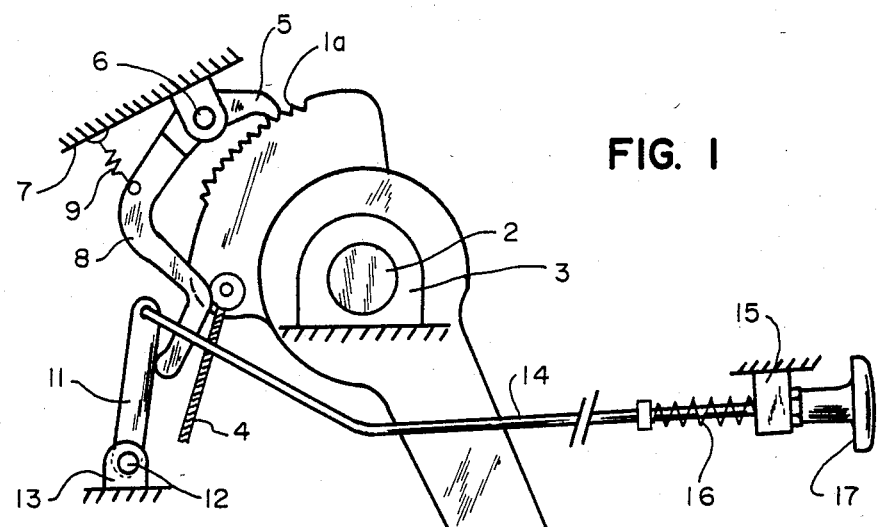
FIG. 1 is a diagrammatic side view of an embodiment of this invention.

In FIG. 1, which shows an embodiment applied in a foot-depress type parking brake, 1 denotes a pedal (actuator) which is rotatably fixed about an axis with a pin 2 to an appropriate stationary member 3 such as a brake bracket (not shown) and connected to a parking brake mechanism (not shown) by means of a wire 4. The pedal 1 is, along the arcuate upper end portion thereof, provided with a quadrant 1a including a number of triangular teeth or cogs in a so-called quadrant manner, with which quadrant is a pawl 5 engaged. By way of a pin 6 the pawl 5 is rotatably fixed about an axis to a stationary member 7 and is allowed to be released from the quadrant 1a. A first lever 8 having a free end is secured to the pawl 5 (in this embodiment the pawl 5 and the first lever 8 are integrally made) for being able to rotate as one body. The lever 8 is of letter S shape in its side view and is offsetly or staggeredly disposed, at least at the otherwise interferred portion with the pedal 1, therefrom to be positioned in front, in FIG. 1, in relation to the drawing paper surface, to avoid the interference with the pedal 1. A tension spring 9 anchored between the first lever 8 and the stationary member 7 constantly biases the first lever 8 and the pawl 5 in the clockwise direction.

On the other hand, a second lever 11 having a free end is pivoted about an axis, with a pin 12, at another end thereof to a stationary member 13, and is connected to bent portion of a release rod 14, which rod is slidably retained in the axial direction at the other end thereof by a stationary member 15 while being constantly biased in the leftward direction with a compression spring 16. The release rod 14 is, at the rightward extremity, provided with a knob 17 which abuts the stationary member 15 for being restrained not to move leftwards beyond a certain preset position.

Although FIG. 1 shows a brake-released state, the pedal 1 is, when the vehicle is parked, depressed to rotate in the clockwise direction, while the pawl 5 moves about its axis, surpassing the elasticity of the tension spring 9, to the counterclockwise direction relative to the pedal 1, which means a movement of the quadrant 1a in that direction. The quadrant is not allowed to move in the reverse direction for keeping the parking brake in a braked condition. The pedal 1, when once depressed, keeps the depressed state irrespective of the rotative force in the return direction given through the wire 4. Releasing of the parking brake can be executed only by drawing of the knob 17, which imparts the second lever 11 a rotative force via the release rod 14. A resulting clockwise rotation of the second lever 11 about its axis causes, in turn, a counterclockwise rotation of the first lever 8 and the pawl 5, bringing about the release of the pawl 5 from the quadrant 1a for allowing the return of the pedal 1 back to the released position.

The second lever 11 abuts, at the middle portion thereof, the free end of the first lever 8 (at a first substantially single point of contact, at the outset for rotating the same in the counterclockwise direction. Assume the dimensions of the respective parts of the pawl 5, the first lever 8, and the second lever 11 are represented with signs shown in FIG. 2, then the operating power applied at the knob 17 will be amplified or multiplied, at the tip of the pawl 5, by about $R_1$, that is the value determined in the following equation:

$$\frac{l_4}{l_3} \times \frac{l_2}{l_1} = R_1$$

Figure 2:
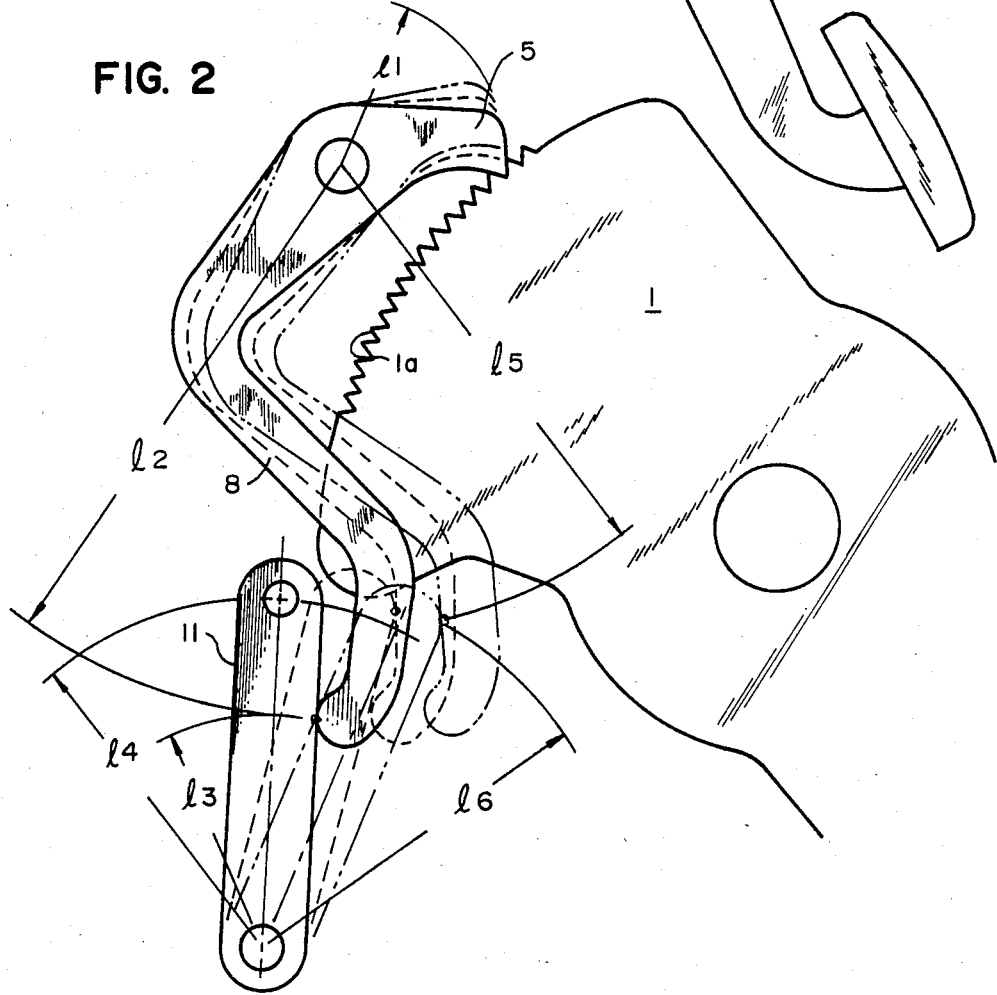
FIG. 2 is an explanatory view of a device shown in FIG. 1.

When the knob 17 is drawn further, the second lever 11 will begin to contact, with its free end or tip, the intermediate portion of the first lever 8 (at a second substantially single point of contact), as shown in FIG. 2 with two-dot chain lines, when the operating power applied to the knob 17 will be amplified or multiplied at the tip of the pawl 5 by about $R_2$, that is the value determined by the following equation:

$$\frac{l_4}{l_6} \times \frac{l_5}{l_1} = R_2$$

It will be noted that $R_1 > R_2$, because $l_6 > l_3$ and $l_2 > l_5$ $$\therefore \frac{l_4}{l_3} \times \frac{l_2}{l_1} > \frac{l_4}{l_6} \times \frac{l_5}{l_1}, \text{ therefore } R_1 =$$

$$\frac{l_4}{l_3} \times \frac{l_2}{l_1} > \frac{l_4}{l_6} \times \frac{l_5}{l_1} = R_2$$

Explaining this in other words, the amplification of force, the lever ratio $R_1$, is high in the initial stage and drops suddenly at a certain point down to $R_2$.

Since the point at which the lever ratio is changed to a low level is that when the intermediate portion of the first lever 8 contacts the free end of lever 11 as shown in FIG. 2 with broken lines, it is required for the pawl 5 to be released from the quadrant 1a a moment before this lever ratio begins to fall. An ideal release mechanism can be attained by constructing it such that the lever ratio is maintained high only while the pawl 5 is in engagement with the quadrant 1a and is lowered after the release of the engagement.

To sum up the feature of this invention, it can be said to have completely solved the apparently illogical problem or thesis of lowering the operating power without increasing the drawing stroke of the knob 17 by ingeniously utilizing the characteristic of the release mechanism which needs a high lever ratio while the pawl 5 and the quadrant are in engagement, and does not need it after the pawl 5 has been released from the quadrant 1a.

A few more comments will be added for better understanding of the invention.

Figure 3:
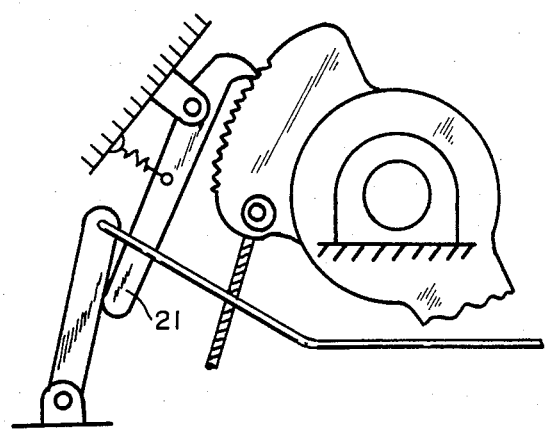
FIG. 3 is a diagrammatic side view showing another embodiment wherein a first lever is a straight bar-like member.
Figure 4:
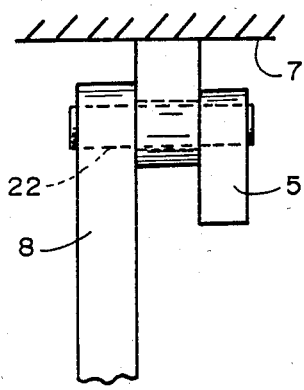
FIG. 4 is a fragmentary view of an essential part of still another embodiment wherein a pawl and a first lever are separately made for being connected together with a pin.
Figure 5:
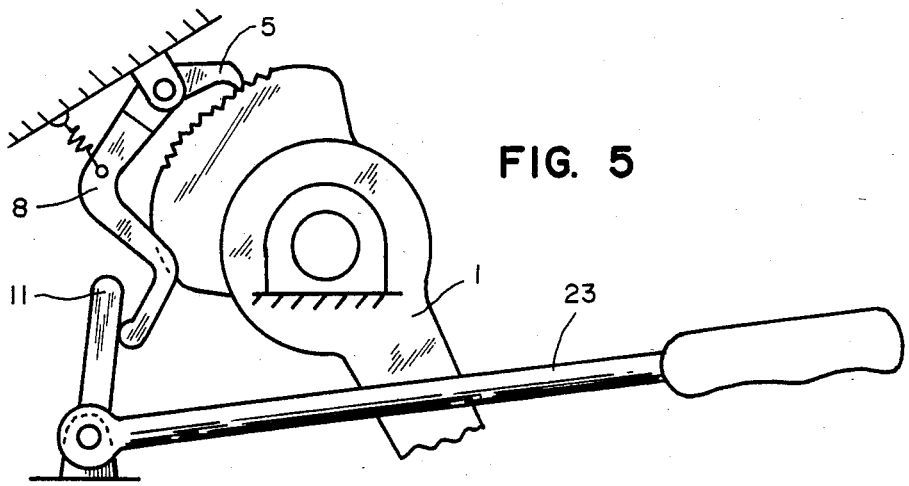
FIG. 5 is a diagrammatic side view of still another embodiment wherein a mechanism for giving the rotative force to a second lever is directly secured to the second lever.

The S letter shape of the first lever 8 in the embodiment is not essential to this invention, although it is advantageous for being compactly accommodated wholly with other parts of the mechanism in a brake bracket; a straight bar-like lever is also permissible, as shown in FIG. 3. The pawl 5 and the first lever 8 may be separately manufactured for being connected together with a pin 22, as shown in FIG. 4, which pin is to be pivoted to a stationary member 7. A mechanism for giving the rotative force to the second lever 11 is not limited, either, to the release rod 14 employed in the embodiment; it may be a rotative lever 23 directly secured to the second lever 11 as shown in FIG. 5.

Figure 6:
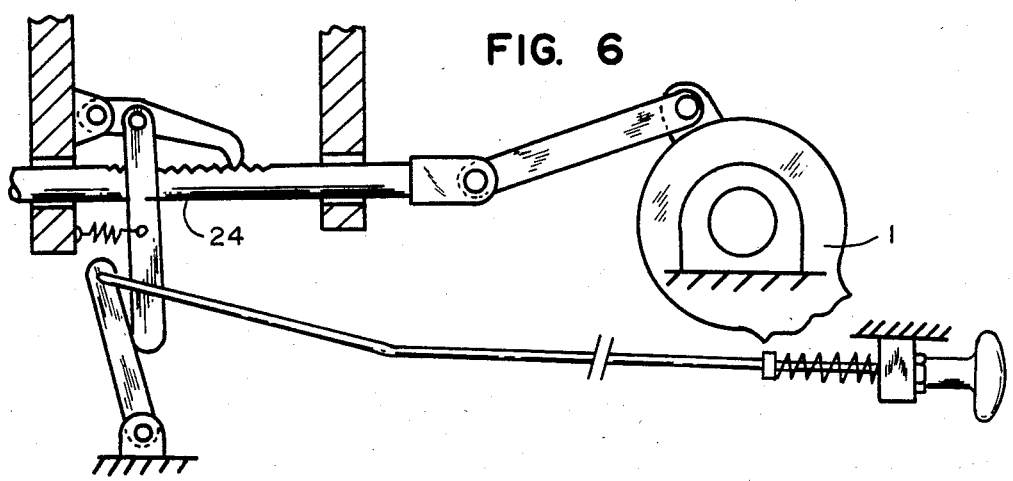
FIG. 6 is a diagrammatic side view of further embodiment for showing a quadrant disposed on a member which connects the pedal and the parking brake mechanism for being movable in a straight line direction.

Furthermore, a member on which teeth are disposed is not limited to the pedal 1. Disposing the same on a reciprocally movable member 24 which connects the pedal 1 and the parking brake mechanism is also permissible as shown in FIG. 6. An application of this parking brake releasing mechanism to a manual type parking brake system is allowed without any hitch.

As described in greater detail above, this invention exhibits an excellent effect of minimizing the operating power in a parking brake releasing mechanism used for vehicles without increasing the pulling or drawing stroke of the knob.

It will be obvious to those skilled in the art that various changes may be made without departing from the scope of the invention and the invention is not to be considered limited to what is shown in the drawings and described in the specification.

What is claimed is:

1. A parking brake release mechanism for use in association with a parking brake actuator member having a toothed quadrant disposed on a part thereof and movable between a brake applied and brake release position, said release mechanism comprising:

a pawl which is engaged with said toothed quadrant for restraining the movement of said actuator member to its brake release position;

a first stationary member rotatably supporting said pawl about a first axis;

a first lever secured to said pawl and integrally rotatable with said pawl, said first lever having an intermediate portion terminating in a free end remote from said first axis;

a second stationary member;

a second lever pivotally coupled to said second stationary member for rotation about a second axis and having an intermediate portion terminating in a free end remote from said second axis, said free end of the first lever abutting the intermediate portion of said second lever at a first substantially single point of contact to maintain a lever ratio of the mechanism at one level while said pawl is engaged with said quadrant;

means for imparting rotative force to said second lever to cause the intermediate portion of said second lever to move against the free end of said first lever solely at said first point of contact and rotate while maintaining said first point of contact to cause rotational movement of said first lever to disengage said pawl from said quadrant, said first lever being spaced from said second lever such that said first lever only contacts said second lever by engagement of said free end of said first lever abutting the intermediate portion of said second lever at said first point of contact during rotation of said first and second levers until disengagement of said pawl from said quadrant whereupon said free end of said second lever contacts said first lever solely at the intermediate portion of said first lever at a second substantially single point of contact to thereby effect a sudden decrease in lever ratio to a level lower than said one level upon further rotation of said second lever.

2. A mechanism in accordance with claim 1, wherein said first lever is of S letter shape.

3. A mechanism in accordance with claim 1, wherein said first lever is a straight bar-like member.

4. A mechanism in accordance with claim 1, wherein said pawl and said first lever are integrally manufactured.

5. A mechanism in accordance with claim 1, wherein said pawl and said first lever are separately manufactured for being connected together by a pin to be pivotally supported by said first stationary member.

6. A mechanism in accordance with claim 1, wherein said means for imparting rotative force to said second lever is a partly bent rod, which is slidingly movable by means of drawing with a knob, pivotally connected to said second lever.

7. A mechanism in accordance with claim 1, wherein said means for imparting rotative force to said second lever is a rotatable lever directly secured to said second lever.

8. A mechanism in accordance with claim 1, wherein said parking brake actuator member is a pedal which is rotatable about a third axis and is provided with said quadrant on an arcuate upper end thereof.

9. A mechanism in accordance with claim 8, wherein said first lever is disposed in a plane separate from and parallel to the plane in which said pedal is rotated.

10. A mechanism in accordance with claim 8, wherein said quadrant is disposed on a part of said pedal.

11. A mechanism in accordance with claim 1 wherein said actuator member is connected to a pedal and movable in a straight line direction in response to pedal movement.

12. A release mechanism for releasing a parking brake including an actuator member operated to apply a parking brake and having a toothed portion for locking the actuator member in a selected position, which comprises:
a pawl supported pivotally about a first axis adjacent said toothed portion and engageable with the toothed portion;
a first lever coupled to said pawl for pivotally moving said pawl about said first axis and having an intermediate portion and an end portion coupled to said intermediate portion;
a second lever supported at one end thereof pivotally about a second axis and having an intermediate portion and an end portion coupled to the intermediate portion of said second lever; and
a release member coupled to said second lever to pivot said second lever about said second axis and into contact with said first lever end portion at a first substantially single point of contact and rotate said second lever while maintaining said single point of contact, said intermediate portion of the second lever abutting the end portion of the first lever at said first substantially single point of contact during an initial pivotal motion of the second lever by said release member to rotate said first lever while maintaining said single point of contact until said pawl has been pivoted away from said toothed portion, said first and second levers being spaced from one another such that said first lever engages said second lever solely by the contact of said first lever end portion with the intermediate portion of said second lever at said first point of contact during rotation of said first and second levers until said pawl has been pivoted away from said toothed portion, whereupon said end portion of the second lever abuts the intermediate portion of the first lever at a second substantially single point of contact upon disengagement of said pawl from said toothed portion, said abutment of the end portion of the second lever with the intermediate portion of the first lever at said second point of contact effecting a sudden decrease in the lever ratio of the mechanism from one distinct ratio to another distinct ratio to thereby decrease a required force appled to said release member during said initial pivotal motion and decrease a required operation stroke of the release member during a following pivotal motion of the second lever by the release member after said disengagement of the pawl.

13. A release mechanism in accordance with claim 12, wherein said actuator member comprises a brake pedal pivotable about a third axis and having said toothed portion along an arcuate periphery at one end thereof located adjacent said pawl.

14. A release mechanism in accordance with claim 13, wherein said first lever is disposed in a plane separate and parallel to the plane in which said pedal is rotated.

15. A release mechanism in accordance with claim 12, wherein said first lever is pivoted about said first axis.

16. A release mechanism in accordance with claim 12, wherein said release member comprises a rod slidably supported and having a bent portion pivotally coupled to the second lever.

17. A release mechanism in accordance with claim 12, wherein said pawl and said first lever comprise a single integral lever of generally S-letter shape having a free end forming the end portion which is turned toward the intermediate portion of said second lever, and the intermediate portion of the second lever has a straight surface abutting said free end of said first lever during said initial pivotal motion of the second lever.

18. A release mechanism comprising:
a first member having an engaging end and an intermediate portion coupling said engaging end to a free end;
means for rotatably supporting said first member;
a second member having an intermediate portion coupled to a free end;
means for rotatably mounting said second member; and
means for moving the intermediate portion of said second member into contact with the free end of said first member at a first substantially single point of contact and rotate said second member while maintaining said first point of contact to cause rotational movement of said first member, said first and second members being cosntructed and arranged such that said first and second members engage one another solely by said contact of the intermediate portion of said second member with the free end of said first member at said first point of contact during rotation of said first and second members to produce a first distinct lever ratio until such time as further rotational movement causes the free end of said second member to contact the intermediate portion of said first member at a second substantially single point of contact and decrease said lever ratio from said one distinct ratio to another distinct ratio.

* * * * *